United States Patent [19]

Stewart et al.

[11] 4,285,813

[45] Aug. 25, 1981

[54] AQUARIUM FILTRATION APPARATUS

[75] Inventors: James B. Stewart, Randolph, Township, Morris County, N.J.; Klaus W. Woltmann, New York, N.Y.; Edwin E. Faris, Wyckhoff; Sheldon P. Schmidt, Paramus, both of N.J.

[73] Assignee: Metaframe Corporation, Elmwood Park, N.J.

[21] Appl. No.: 53,112

[22] Filed: Jun. 28, 1979

Related U.S. Application Data

[63] Continuation of Ser. No. 890,365, Mar. 27, 1978, abandoned.

[51] Int. Cl.³ .................................................. E04H 3/20
[52] U.S. Cl. .................................... 210/169; 210/416.2
[58] Field of Search ............. 210/169, 75, 193, 416 AS

[56] References Cited

U.S. PATENT DOCUMENTS

| 2,985,307 | 5/1961 | Glasmore et al. | 210/169 |
|---|---|---|---|
| 2,985,308 | 5/1961 | Koepel | 210/169 |
| 3,321,081 | 5/1967 | Willizer | 210/169 |
| 3,392,836 | 7/1968 | Willizer | 210/169 |
| 3,512,646 | 5/1970 | Willizer | 210/169 |
| 3,719,278 | 3/1973 | Koldeltz | 210/169 |
| 3,720,317 | 3/1973 | Willizer | 210/169 |
| 3,738,494 | 6/1973 | Willizer et al. | 210/169 |
| 3,892,663 | 7/1975 | Wedenmann | 210/169 |
| 4,051,033 | 9/1977 | Blare | 210/193 |

Primary Examiner—Theodore A. Granger
Attorney, Agent, or Firm—Hubbell, Cohen, Stiefel & Gross

[57] ABSTRACT

Aquarium filtration apparatus having a generally trough-shaped filter housing, the rear wall having a bracket portion for hanging on an aquarium, an impeller assembly having a drive magnet being positioned within the bottom of the filter housing with a motor assembly coupled to the undersurface of the bottom with a power driven magnet on the motor assembly in spaced proximate relation to effect magnetic coupling with the magnet of the impeller assembly. An intake assembly is provided in fluid communication with the impeller assembly and with the aquarium water for drawing water from the aquarium into the filter housing. In a first embodiment, the intake assembly is an intake tube having a portion within the filter housing. In a second embodiment, the intake assembly includes a filter chamber within the filter housing in fluid communication with the impeller assembly with an intake tube coupled to the filter chamber for drawing water from the aquarium into the chamber. A top cover is provided with a float having an indicator portion extending through the cover which is viewable when the water level rises to pivot the float. A filter cartridge may be utilized or filtration media may be retained between removable platforms.

13 Claims, 8 Drawing Figures

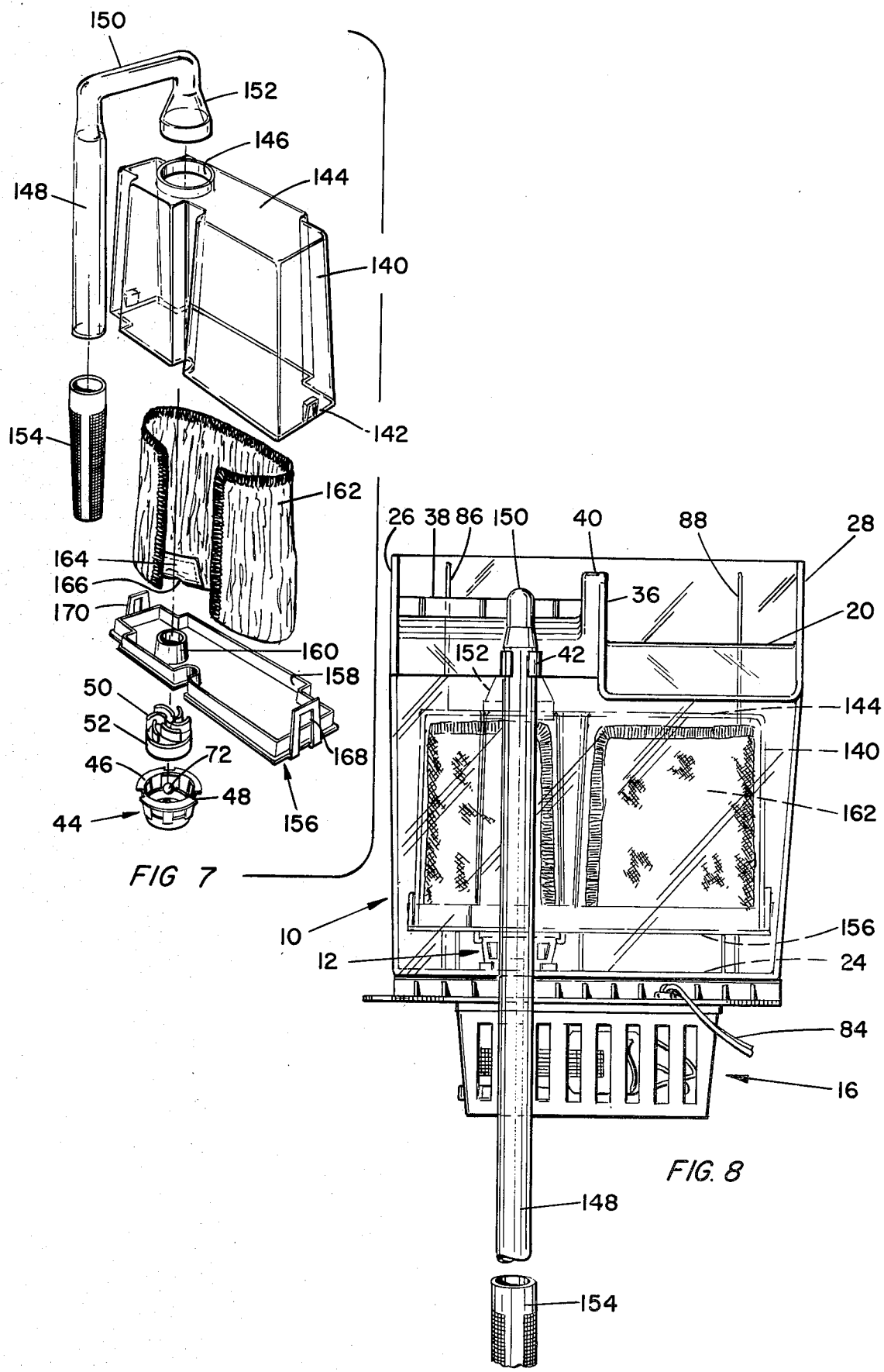

AQUARIUM FILTRATION APPARATUS

This is a continuation of application Ser. No. 890,365, filed Mar. 27, 1978 now abandoned.

BACKGROUND OF THE INVENTION

The background of the invention will be discussed in two parts:

1. Field of the Invention

This invention relates to aquarium filtration apparatus, and more particularly to an external filter having a housing with a bracket portion for hanging on the outside of an upper edge of the aquarium.

2. Description of the Prior Art

Prior art external filters have generally included an intake tube, commonly referred to as a siphon tube for drawing water from the aquarium into the filter housing. A discharge tube was utilized, in conjunction with a pump means, to remove the filtered water from within the filter housing for return to the aquarium. One such aquarium filter is shown and described in U.S. Pat. No. 3,321,081 to Willinger, issued May 23, 1967. With an intake tube or siphon tube, the tube is in the form of an inverted generally J-shaped tube, the long end of which extends into the water of the aquarium with the short end being directed into the filter housing with the intake tube being hung over the bracket portion of the filter housing. With such siphon tubes, a hand-operated auxiliary pump is normally employed to draw the water from the aquarium over the highest point in the intake tube to commence the siphoning action. With such siphon systems, when the water level is low within the aquarium itself, a slight dislocation of the siphon tube results in the breaking of the siphoning action. Since the intake tube is generally just suspended over the edge, the fish within the aquarium often times contact the siphon tube, thereby dislocating it an amount sufficient to break the siphon. Such filtration apparatus is not self-priming and as a consequence, the filter pump can be operating without water being drawn into the filter housing. When this operates for any extended length of time without being noticed by the owner of the aquarium, the aquarium water can become debris-laden very rapidly resulting in a cloudy texture for the water with a corresponding detriment to the inhabitants of the aquarium and damage to the pump.

Accordingly, it is an object of this invention to provide a new and improved aquarium filtration apparatus.

It is another object of this invention to provide a new and improved aquarium filtration apparatus having a single intake tube for drawing water into the filter.

It is a further object of this invention to provide a new and improved filter having an intake assembly including a filter chamber.

It is a still further object of this invention to provide a cover for the filter including a visible indicator to indicate an abnormal level of water within the filter.

SUMMARY OF THE INVENTION

The foregoing and other objects of the invention are accomplished by providing aquarium filtration apparatus having a generally trough-shaped housing with a bracket portion configured for engaging the upper edge of an aquarium to suspend the filter housing on the exterior of the aquarium. An impeller assembly is positioned within the bottom of the filter housing, the impeller assembly including an impeller having a magnet coupled thereto, the magnet being in spaced proximate relation to the bottom of the housing. The impeller is configured for drawing fluid into the filter housing. A power driven magnet is coupled to a motor coupled to the undersurface of the bottom of the housing and positioned to effect magnetic coupling between the motor magnet and the impeller magnet. An intake tube assembly in fluid communication with the impeller assembly has a portion thereof extending into the aquarium water for withdrawing the water into the filter housing. Retaining means are provided on the bracket portion of the housing for fixedly positioning the intake tube.

In a first embodiment, the intake tube assembly is an inverted generally U-shaped intake tube having one end thereof coupled to the inlet aperture of the impeller assembly, the tube within the filter housing having a reduced diameter portion to reduce starting time for full operation.

In a second embodiment, a filtration chamber of an inverted trough-shaped form is provided with a bottom plate having an aperture herein coupled to the bottom housing of the impeller assembly with the upper surface of the filter chamber being provided with an intake tube aperture coupled to an inverted generally J-shaped intake tube for drawing water from the aquarium into the filter chamber. A porous filter bag is provided for receiving diatomaceous material, the filter bag being positionable within the filter chamber for filtering the same.

In the first embodiment, the filtering means include a perforated platform positionable in generally parallel relation to the bottom on spacing ridges formed within the housing, the platform retaining a reusable coarse filtering pad having loose charcoal filtering media resting thereon with a fine filter material on the charcoal, with a perforated retainer plate positioned thereon, the retainer plate being locked in position by locking notches integrally formed within the interior of the housing.

With water within the filter housing covering the impeller assembly, the device is self-priming and self-starting to provide sufficient intake suction to lift the water in the aquarium above the highest point on the intake system. Water is returned to the aquarium by means of a spillway integrally formed with the bracket portion.

A cover plate is provided for the top part of the housing, the cover plate including a float member pivotably mounted to the undersurface thereof, the float member having an integral indicator portion extending through a slot in the cover, the indicator portion being invisible when the water level within the filter housing is normal, the indicator float member rising to a visible position as the water level rises, to thereby indicate a clogged filter.

Other objects, features and advantages of the invention will become apparent from a reading of the specifications when taken in conjunction with the drawings in which like reference numerals refer to like elements in the several views.

BRIEF DESCRIPTION OF THE DRAWINGS

FIG. 7 is an exploded perspective view of a filter chamber for use with the aquarium filtration apparatus of FIG. 1; and FIG. 8 is a rear view of the filter housing with the apparatus of FIG. 7 therein.

DESCRIPTION OF THE PREFERRED EMBODIMENT

Figures 1, 2:
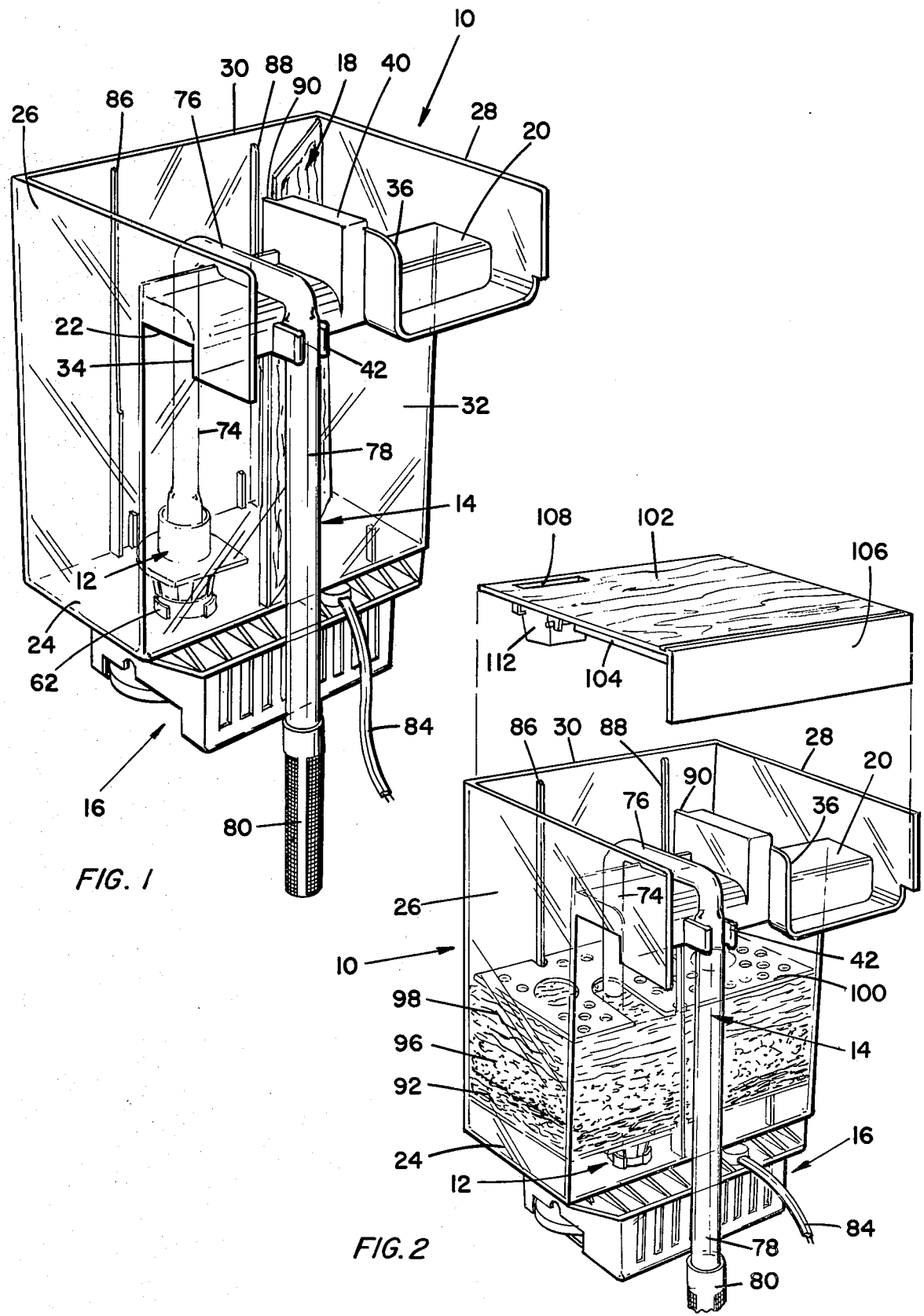
FIG. 1 is a perspective view of the aquarium filtration apparatus according to the invention with a filtration cartridge in exploded relation therewith.
FIG. 2 is a perspective view of the aquarium filtration apparatus of FIG. 1 with filtering media in position therein with a filter housing cover in exploded relation therewith.

Referring now to the drawings and particularly to FIG. 1 there is shown an aquarium filtration apparatus according to the invention, the apparatus including a filter box for filter housing generally designated 10 having an impeller assembly generally designated 12 positioned within the bottom thereof, the impeller assembly 12 being coupled to an intake tube assembly generally designated 14. Mounted externally of the filter housing 10 on the bottom thereof is a motor assembly generally designated 16, which as well hereinafter be explained, as a portion thereof magnetically coupled to a magnetically driven impeller within the impeller assembly 12 to draw aquarium water through the intake tube assembly 14 into the bottom of the filter housng 10. A suitable filtration cartridge 18 may be positioned within the housing 10 to divide the inner portion of the housing 10 into two portions, these being a debris-laden fluid receiving portion within which the impeller assembly 12 is positioned, and a clean or filtered water portion on the opposite surface of the filtration cartridge 18 from whence the water is discharged through a spillway 20 formed integrally in a bracket portion 22 of the filter housing 10.

More specifically, the filter housing 10 is a generally trough-shaped housing configured for receiving aquarium water therein, the housing 10 having a bottom 24 with sidewalls 26 and 28 extending upwardly therefrom, with a front wall 30 and a rear wall 32, the upper edge of sidewalls 26 and 28 and front wall 30 being a common plane at an elevation above the bracket portion 22 which is integrally formed with the rear wall 32. The bracket portion 22 is configured for resting on the upper edge of an aquarium wall, the bracket portion 22 having a downwardly depending lip portion 34 generally parallel to rear wall 32 for assisting in maintaining the filter housing 10 on the aquarium.

The outer surface of the bracket portion 22 is divided into two parts, one portion being the spillway 20 which has a planar surface generally parallel to the plane of the upper edge of the front and sidewalls, but at a lower elevation, the spillway 20 directing water between sidewall 28 and an opposite chute wall 36 which is contoured downwardly and then in a plane parallel to the plane of the spillway 20 to provide a water return having a fairly broad surface over which the water passes back to the aquarium. With the water spilling over the spillway 20, due to this broad surface, the water flows in a thin sheet, thereby providing a large area of water exposed to the atmosphere within the room to assist in oxygenation of the clean water being returned to the aquarium.

The second portion of the bracket portion 22 includes an upwardly extending shoulder portion 28 transverse to the plane of the bracket portion 22 and intermediate the sidewall 26 and an upwardly extending generally centrally disposed integral abutment 40. The outer surface of the lip portion 34 within the space is provided with tube retaining means in the form of a clip 42 which fixedly positions the intake tube 14 relative to the housing 10.

The upper edge of the shoulder 38 is positioned above the plane of the spillway 20, with the shoulder 38 being within the debris-laden fluid receiving portion of the filter housing 10, and with the filtration cartridge 18 in position within the filter housing 10, the upper edge of cartridge 18 is approximately coextensive with the upper edge of shoulder 38 to effectively divide the interior of the filter housing 10 into the two portions of the clean water being segregated from the dirty water entering the filter housing through the intake tube 14.

Figure 3:
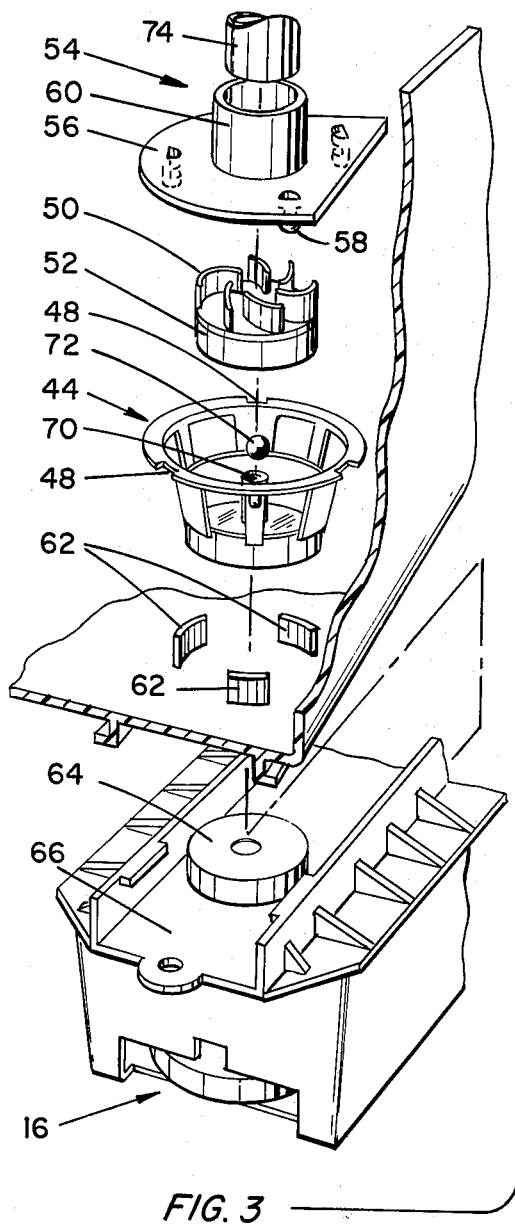
FIG. 3 is an exploded perspective view of the impeller assembly utilized in the apparatus of FIG. 1.
Figure 4:
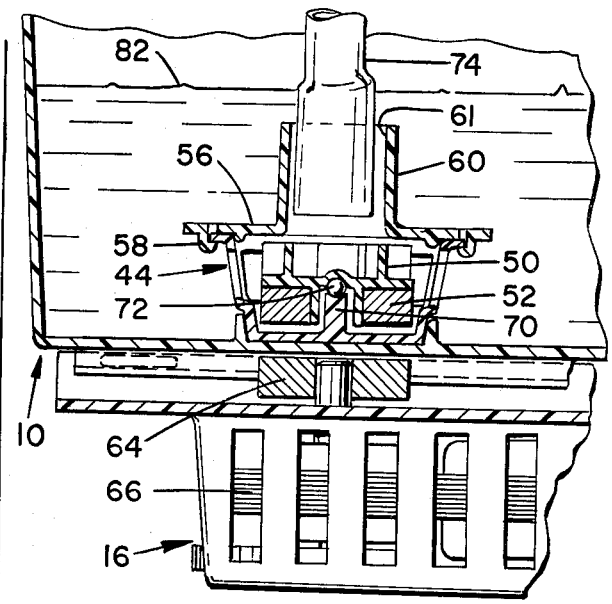
FIG. 4 is a partial cross-sectional view illustrating the impeller assembly in assembled relation within the housing with the motor coupled to the undersurface of the housing.

Referring now to FIGS. 1, 3 and 4, the details pertaining to the impeller assembly and the driving thereof will be discussed. As shown in FIG. 3, the impeller assembly 12 includes a bottom housing 44 which has a generally cup-shaped bottom portion with upwardly extending ribs terminating in a peripheral flange 46 which has suitable notches 48, three in total, equally spaced about the periphery thereof. The bottom housing 44 is a cage assembly, the spacing between ribs thereof providing passageways for the flow of water. Positioned within the cup-shaped portion of the bottom housing 44 is an impeller 50 having radially extending arcuate turbine vanes configured, when driven, for drawing water into the bottom housing 44 for discharge through the water passageways between adjacent ribs. The impeller 50 is circular in plan view and has a generally water-shaped ceramic magnet 52 suitably secured to the bottom thereof, the magnet 52 being configured for positioning within the cup-shaped portion of the bottom housing 44 for being in spaced proximate relation to the bottom 24 of the filter housing 10. A top housing 54 has a plate portion 56 with a plurality of downwardly depending lugs 58 engagable by the flange portion 46 of the bottom housing 44 with the notches 48 aligned with lugs 58, rotation of the bottom housing 44 then securing the flange 46 to the lugs 58. The top housing 54 is provided with a centrally disposed tubular portion 60, the inner diameter of which is slightly larger than the diameter of the coacting portion 74 of the intake tube 14 which is positioned within tubular portion 60, this spacing permitting water to be drawn in at the tubular portion 60 for self-priming as will hereinafter be described, and also serving to prevent cavitation during operation.

As best illustrated in FIG. 4, the interior surface of the bottom 24 of filter housing 10 is provided with upwardly extending integral arcuate tangs 62 which generally define a circle of a diameter generally equal to the diameter of the cup-shaped portion of the bottom housing 44 of the impeller assembly 12. The tangs 62 fixedly position the impeller assembly 12 relative to a magnet 64 which is power driven by means of a motor 66 within the motor assembly 16 which is suitably coupled to the undersurface of the bottom 24 by means of guide rails 68 suitably engaging opposing flanges on opposite long sides of the motor assembly 16. When so mounted, the power driven magnet 64 is generally coaxial with the magnet 52 of impeller 50. The inner surface of the cup-shaped portion of bottom housing 44 is provided with an upwardly extending centrally disposed pivot projection 70 which has a spherically contoured upper edge for receiving therein a ball bearing 72 captively retained within impeller 50, the bearing 72 being formed of Nylon or Teflon or other similar self-lubricating type plastic material. Alternatively, the bearing 72 may be integrally molded with projection 70, if desired. Similarly, the impeller 50, the lower housing 44, and the upper housing 54 are formed of plastic material, there being no metallic components within the fluid receiving chamber within filter housing 10.

Referring again to FIG. 1, the intake tube assembly 14 is in the form of an inverted generally J-shaped tube, having a short arm 74, a bent portion 76 and a long arm 78, the long arm 78 being suitably captively retained by the clip 42. The bent portion 76 and the short arm 74 are of a smaller diameter, with the terminal end of arm 74 being of an enlarged diameter sufficient to fit within the tubular portion 60 of the top housing 54 of the impeller assembly 12. As shown in FIG. 1, the long arm 78 is of a length sufficient to have the terminal end thereof below the water level within the aquarium with a strainer member 80 secured to this terminal end for restricting the size of particles which may enter through the intake tube assembly 14.

Referring again to FIG. 4, the operation of the filtration apparatus will be discussed. With the motor assembly 16 mounted to the undersurface of the bottom 24 filter housing 10 and the impeller assembly 12 in position as illustrated in FIG. 4, with the enlarged end of the short arm 74 of the intake tube assembly 14 in place, water is added within the filter housing 10 to a water level 82 which is above the highest point of the tubular portion 60 of the impeller assembly 12, thus providing a water seal between the terminal end of tube 74 and the impeller assembly 12. The motor 66 of motor assembly 16 is then suitably energized by connection of the electrical cord 84 to a suitable source of power to thereby drive the power driven magnet 64 which is generally circular in plan view and in spaced proximate relation to the bottom 24 in generally coaxial alignment with the ceramic magnet 52 of impeller 50 to thereby effect the magnetic coupling which drives impeller 50. The impeller 50 then draws water in through the passageway 61 formed between the innersurface of tubular portion 60 and the outside of short arm 74 of intake tube 14, drawing in the water from the filter. By virtue of this loose-fitting arrangement between the terminal end of short arm 74 and the tubular portion 60 of the impeller assembly 12, with the initial source of water being from the few inches of water placed in the filter housing 10, any air trapped in the impeller assembly 12 is discharged. With the water continuously circulating through the impeller assembly, suction is generated to commence drawing air from within the intake tube along with water from the aquarium until all the air is removed. By the utilization of a motor and impeller combination capable of generating a large amount of intake suction, the apparatus is self-priming and anti-cavitating. The debris-laden fluid from the aquarium then passes through the water passageways within the bottom housing 44 of the impeller assembly 12 to thereby raise the water level 82 until the fluid reaches the level of spillway 20 at which point it is discharged back into the aquarium. With the filter cartridge 18 in position, the interior of filter housing 10 is divided into two portions, one portion being in proximity to the impeller assembly 12 for receiving the dirty water from the aquarium, this water then being filtered through the filter cartridge 18 into a clean water portion where the clean water is thus discharged over spillway 20. With the water being positively drawn into the filter housing 10, the filtration apparatus according to the invention can operate at low water levels within the aquarium in contrast to prior art filters which utilize a siphon tube, the terminal end of which within the filter housing is disposed at a higher elevation than the water level in the aquarium, thus making the siphon action impossible. Additionally, with the positive water transportation system of the instant invention, drops in the level of water within the aquarium itself provide little disturbance to the operation of the system, since the motor drive and impeller assembly are so dimensioned and so configured to be capable of generating intake suction of a much greater capacity than required for the water to reach the highest point on the intake system, this highest point corresponding to the elevation of the bent portion 76 of the intake tube assembly 14. Furthermore, with the intake tube assembly 14 captively or fixedly restrained by means of a clip 42, dislodging of the intake tube assembly 14 by the fish within the aquarium is more difficult.

Referring now to FIG. 2, a second means of filtering is illustrated within the housing 10, this filtering means being utilized in lieu of the filtration cartridge 18.

The inner surface of front wall 30 is provided with a pair of vertical ribs 86 and 88 which are spaced in generally parallel relation with the inner surface of rear wall 32 being provided with a similar vertically extending rib 90 which is generally centrally disposed, the ribs 86, 88 and 90 having the peripheral edges thereof contoured to provide spacers and locking notches at different elevations. Resting on the spacer portion of each of the ribs 86, 88 and 90 in spaced parallel relation to the bottom 24 is a perforated platform 92 having a cutaway portion (not shown) for encircling the flange portion 56 of the top housing 54 of the impeller assembly 12. The platform 92 is thereby maintained in spaced parallel relation to the bottom 24 to thereby define a fluid receiving chamber into which the fluid from the aquarium is drawn through the intake tube assembly 14. Positioned on the platform 92 is a coarse reusable filter pad 94 which has the outer edges thereof configured to matingly engage within filter housing 10 in generally horizontal relation. Loose charcoal 96 is then positioned above the pad 94 and spread out to form a horizontal layer of a desired thickness with the top of this layer having positioned thereon a fine filtering media 98, the filter media 98 being in the form of a floss pad for other suitable fine filtering material generally available in bulk form. A floss pad retainer pad 100, suitably perforated and cut out, has the outer edge thereof contoured to fit within the housing 10 with the edges thereof engaging locking notches configured in the edges of ribs 86, 88 and 90 to thereby retain the filtering media in position to prevent flotation thereof during operation of the filter. As a consequence, the filtering means illustrated in FIG. 2 provides a sandwich assembly of filtering materials retained between opposing platforms or plate members suitably perforated for passage of fluid therethrough with the opposing platforms being suitably configured for retention in fixed positions within the housing 10. In operation utilizing the filtering means depicted in FIG. 2, water enters through the impeller assembly 12 into the chamber from between the bottom 24 and the perforated platform 92, this water being debris-laden fluid. The force of incoming water drives this fluid through the filtering media to be suitably filtered in stages depending on the filtering media through which the fluid passes, the water so filtered being generally above the retainer plate 100, this area above retainer plate 100 being generally a clean-water chamber from which the clean water is discharged back in the aquarium over the spillway 20. The force of the water entering into the chamber between the bottom 24 and the perforated plate 92 creates turbulance and agitation within the fluid in this chamber to maintain particles in suspension, these particles then being driven positively upwardly by means of the force within this chamber to enhance the filtering action. Upon first use of the filter with the filtering media shown in FIG. 2, an amount of water is poured into the filter housing 10 to a level sufficient to cover the impeller assembly 12, the motor is then energized, and the intake suction generated by the impeller assembly 12 draws water and any trapped air through the long arm 78 of the intake tube assembly 14 to the highest point thereof which is the bent portion 76 through the impeller assembly to commence the filtering action of the filtration apparatus.

Figure 5:
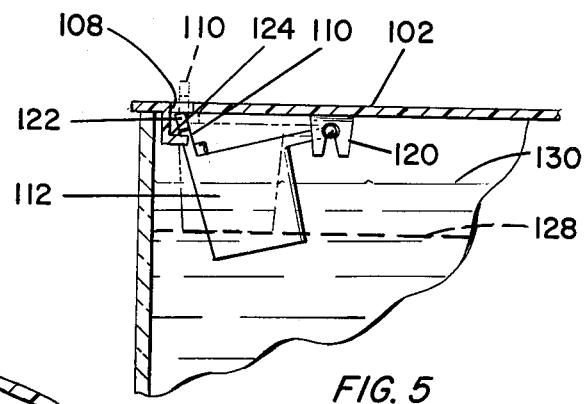
FIG. 5 is a partial cross-sectional view illustrating the relation between the float member of the cover in FIG. 2 with reference to the water level.
Figure 6:
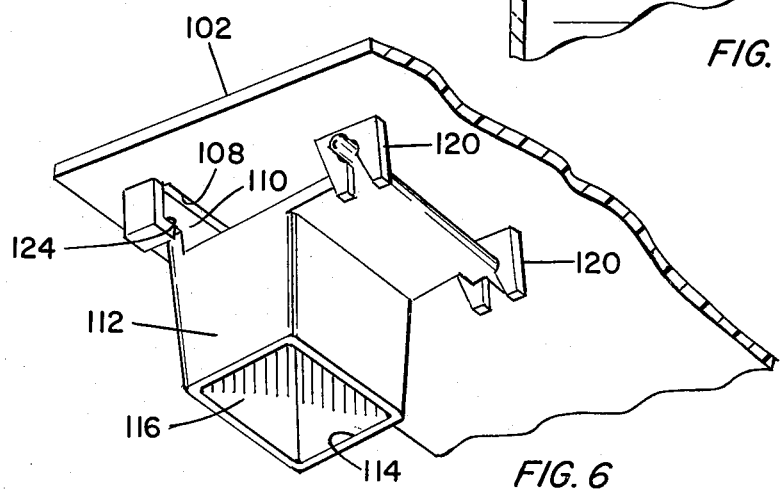
FIG. 6 is a perspective view of the float member of FIG. 5.

As depicted in FIG. 2, a top cover member 102 is provided to enclose the top opening of filter housing 10, the cover member 102 being generally planar and having integrally formed downwardly depending shoulder means 104 which serve as positioning means, the shoulders 104 defining a dimension slightly smaller than the opening of the filter housing 10. The cover member 102 is generally planar and provided with a downwardly depending generally planar plate portion 106 which is configured to abut against the inwardly or rearwardly extended edges of sidewalls 26 and 28 adjacent bracket portion 22. The cover member 102 provides an aesthetically pleasing appearance by covering the top portion of the filter housing 10. An edge of the cover member 102 is provided with an elongated slot 108. As shown in FIG. 5, extending through the slot 108 is an indicator projection 110 which is integrally formed in an upper surfce of a float member 112, the float member 112 being in the form of an inverted trough having an open bottom 114 communicating with the cavity 116 within the inverted trough-shaped portion. The upper surface of the float member has an integrally formed pivot flange 118 suitably coupled to downwardly depending lugs 120 for permitting pivotable movement of the float member 112. Oppositely disposed from the pivot flange 118 is a second flange portion 122 generally co-planar therewith, the flange portion 122 having outwardly extending stop projections for engaging a recessed 124 formed on the undersurface of cover member 102 for limiting the amount of pivoting of the float member 112. As shown in FIG. 5, with the water level at the level indicated by line 128, the open bottom 114 of the cavity 116 of float member 112 is about the water level 128. As the water level 128 rises to the level indicated by water level line 130, the float member 112 rises due to the entrapment of air within the cavity 116 thereby urging indicator projection 110 upwardly through slot 108 to thereby provide visual indication with the projection 110 being above the plane of cover member 102.

Although the cover is shown in conjunction with the filtering means of FIG. 2, with the cover position on the housing 10 with the filtration cartridge 18 being utilized, the upper edge of filtration cartridge 18 will be generally co-extensive with the upper edge of the shoulder 38 of bracket portion 22, this shoulder 38 being at a level higher than the level of the spillway 20. Consequently, the float member 112 will be positioned within the debris-laden fluid receiving portion of the filter housing 10 and the water level 128, which is the lower water level, will correspond to a clean or rather unclogged filter cartridge 18. The filtration cartridge 18 is on a generally vertical plane diagonally disposed between the rib 90 on the rear wall 32 and an opposite adjacent corner formed by the interior of front wall 30 and sidewll 28. As this filtration cartridge 18 becomes clogged, the water level will rise to the level indicated by line 130 in FIG. 5 thereby urging the float upwardly with projection 110 being visible above the plane of cover member 102 thereby indicating the need for changing the filtration cartridge.

Similarly, the float member 112 can be configured so that with the indicator projection 110 above the surface, a normal water level would be indicated with no such indication providing means for readily disearning an abnormally low water level. This latter situation might occur for example another filtration apparatus in which a low water level would indicate an abnormality in the filtration apparatus, such filtration apparatus being of the conventional type utilizing a siphon tube and a pump for carrying the fluid from within the filter housing back to the aquarium. In either event, a visual indicator means is provided on a top cover member to provide a visual indication of the status of the filtration apparatus.

In an alternate embodiment of the filtration apparatus of FIGS. 1 and 2, the filtering means is arranged in a different configuration and the intake assembly includes means for retaining a filtering media within a filter chamber. As illustrated in FIGS. 7 and 8, the filter chamber includes a filter chamber housing 140 which is of an inverted generally trough-shaped configuration, the filter chamber housing 140 having an overall outer periphery of a smaller dimension than the inner periphery of housing 110 for fitting therein. The filter chamber housing 140 has an open bottom 142 and a closed top 144, the top 144 having an enlarged circular filter chamber opening 146 formed therein. A water intake tube is provided with a long arm 148 for extending downwardly into the aquarium, a bent portion 150 and a downwardly depending portion 152 terminating in an enlarged circular opening for loose-fitting engagement within the filter chamber opening 146. A strainer member 154 is provided for engaging the terminal end of the long arm 148 of the water intake tube.

A bottom platform 156 of generally planar form has an upwardly extending shoulder 158 about the periphery thereof, the shoulder 158 being configured for tight mating engagement within the open bottom 142 of the filter chamber housing 140 for substantially closing the same. In general alignment with the filter chamber opening 146, the platform 156 is provided with a platform nozzle 160 extending upwardly to the interior of the filter chamber, the undersurface of platform 156 being provided with suitable locking lugs for engaging the notches 48 of the impeller basket for bottom housing 44 for rotatably retaining the impeller 50 therein. A filter bag 162, generally in the form of a porous envelope, which is sealed about the periphery thereof with the exception of one lower edge portion which includes a rubber seal 164, the seal 164 being in the form of a rectangular rubber patch having a central opening 166 therein, the opening 166 being stretched to place over platform nozzle 160 to place the filter bag 162 in operative relation relative to the platform 156. In operation, the impeller 50 is assembled into the impeller basket for housing 44, the housing 44 then being secured to the bottom of platform 156 with the impeller 50 being generally centrally located relative to the platform nozzle 160. With the filter bag 162 having the rubber seal 164 thereof mounted on platform nozzle 160, the lower edge of the filter bag 162 is bent to provide the maximum filtration surface area in a minimum volume of space. The filter chamber housing 140 is then positioned over the shoulders 158 for locking engagement with lock tabs 168 and 170 and this so assembled structure is then placed within the housing 10 with the bottom housing 44 of impeller assembly 12 engaging wihin the arcuate positioning tangs 62 to align the impeller magnet 52 with the magnet 64 of the motor assembly 16. The filter housing 10 is then positioned on the aquarium by hanging the bracket portion 22 over the edge thereof, and the filter housing 10 is then filled with water to a level higher than filter chamber opening 146 (see FIG. 8). The motor of the motor assembly 16 is then started, thereby drawing water from within filter chamber housing 140 downwardly and then outwardly through the water passageways in the impeller basket bottom housing 44. The diatomaceous earth is then poured into the water and filter housing 10, the water and diatomaceous earth then being drawn through the filter chamber opening 146 at the top of the filter chamber housing 140 with the diatomaceous earth clinging to the porous sides of the filter bag 162 as water is being drawn through the filter bag 162 for passage through the opening 166 of rubber seal 164 through the platform nozzle 160 through the impeller assembly. The water is allowed to circulate until all the diatomaceous earth powder is drawn into the filter chamber and the water in the filter housing 10 is clear. At this point the enlarged end 152 of the water intake tube is placed within the filter chamber opening 146 with the long end 148 thereof extending downwardly into the aquarium water at which point, the intake suction of the impeller assembly 12 draws water from the aquarium through the long arm 148 of the water intake tube over the bent portion 150 into the filter chamber housing 140, the clean water then pouring over the spillway 20 to be returned to the aquarium. The long arm 148 of the intake tube is clamped in place by clip 42 to fix the position thereof relative to the filter chamber housing 143.

In operation, water entering through tube 150 cascades or falls through the bell-shaped portion, or enlarged end 152, which never fills with water. Consequently if the water level within the aquarium drops below a level necessary to sustain withdrawal of water from the aquarium, tube 150 does not draw water from the filter housing 10 back into the aquarium. Thus the construction provides anti-siphoning advantages and precludes reverse siphoning.

Consequently, as hereinabove described, there has been shown and described an aquarium filtration apparatus utilizing an impeller assembly in conjunction with an intake system which may be in the form of the intake tube of FIG. 1 or the diatomaceous earth filter chamber of FIG. 7 and 8 to thereby utilize a single tube in the apparatus for positively drawing in water from the aquarium, then cleansing the water by one of three different filtering means, the clean water then being returned to the aquarium over a broad surfaced spillway 20 in a thin sheet to assist in aeration or oxygenation of the clean water thus enhancing the clean water environment of the inhabitants within the aquarium. While there has been shown and described a preferred embodiment, it is to be understood that various other adaptations and modifications may be made within the spirit and scope of the invention.

What is claimed is:

1. In an aquarium filtration apparatus, the combination comprising:
   a generally trough-shaped filter housing having an open top and a bottom;
   bracket means for suspending said filter housing on an aquarium edge;
   an impeller type suction means within said housing fixedly positioned relative to the bottom thereof;
   intake tube means extending from within said housing over said bracket means and having one end thereof in fluid communication with said suction means and the other end thereof configured for immersing beneath the water level of the aquarium, said suction means having an inlet aperture engaging said one end of said intake tube means in spaced relation therewith to define an annular shaped bypass passageway, said suction means and passageway being so constructed and configured that with water within said filter housing above said inlet aperture, said suction means is generally self-priming by drawing water from within said filter housing through said passagewy thereby generating sufficient intake suction to draw water and any trapped air from said intake tube means into said filter housing and that in normal operation said suction means is generally free of cavitation effects, said impeller means generating sufficient suction for drawing said one end of said intake tube into abutment with said impeller means after said self-priming is effected for providing a fluid seal between said filter housing and said impeller inlet opening; and
   means on said housing for generally fixedly position said intake tube means relative to said housing.

2. The combination according to claim 1 wherein said filter housing includes spillway means adjacent the open top thereof for returning water to the aquarium.

3. The combination according to claim 2 wherein said bracket means is an integral bracket portion and said spillway means is a spillway formed in a portion of said bracket portion.

4. The combination according to claim 3 wherein said filter housing includes means for receiving a generally vertically filtration cartridge and said apparatus further includes a member for covering the open top of said housing and a float member pivotably coupled to the undersurface of said cover member, said float member including an indicator portion extending through said cover member for providing a visual indication of the water level within said filter housing beneath said float member.

5. In an aquarium filtration apparatus, the combination comprising:
   a generally trough-shaped filter housing having an open top and a bottom;
   bracket means for suspending said filter housing on an aquarium edge;
   suction means within said housing generally fixedly positioned relative to the bottom thereof;

a second inverted generally trough-shaped housing configured for positioning within said filter housing;

a bottom plate member configured for mating engagement with the bottom opening of said second housing for defining a filter chamber, said bottom plate member having an outlet aperture in fluid communication with said suction means;

an inlet aperture in the top of said second housing aquarium water intake means having one end thereof configured for coupling to said inlet aperture for drawing fluid from the aquarium into said second housing;

a filter media structure within said filter chamber between said inlet and outlet apertures, said structure having an opening in sealing engagement with said outlet aperture, said filter structure being so constructed and arranged for having diatomaceous earth adhere to the surface thereof to provide filtering as water is drawn into said second housing for passage through said filter structure and through said outlet aperture.

6. The combination according to claim 5 wherein said filter structure includes a porous filter bag.

7. The combination according to claim 6 wherein said suction means includes an impeller rotatably mounted within an impeller housing and said impeller housing is attached to said bottom plate member.

8. The combination according to claim 7 wherein said aquarium water intake means includes an inverted generally J-shaped tube configured for drawing water from the aquarium into said second housing.

9. The combination according to claim 8 wherein the end of said intake tube coupled to said inlet aperture is an enlarged generally bell-shaped portion for generally preventing siphoning of water from said filter chamber back into the aquarium.

10. In an aquarium filtration apparatus, the combination comprising:

a generally trough-shaped filter housing having an open top, a bottom, opposing side walls, a front wall and a rear wall, said rear wall including a bracket portion for hanging on an aquarium, said rear wall having means at a lower height than said side walls for returning water to the aquarium over said braket portion;

an impeller assembly having an inlet opening in an upper surface thereof and an impeller therebelow and coaxial therewith, said impeller being coupled to a drive magnet;

means within the bottom of said filter housing for positioning said impeller assembly therein with said magnet in spaced proximate relation to said bottom;

an aquarium water intake tube having one end thereof configured for coupling to the inlet opening of said impeller assembly in fluid communication therewith but with an annular shaped bypass passageway therebetween, said tube also configured for immersing the other end within the fluid in an aquarium tank;

means for fixedly positioning said aquarium water intake tube relative to said impeller assembly; and a motor assembly having a power driven magnet, said motor assembly being coupled on the under surface of said filter housing bottom for retaining said motor thereon with said power driven magnet in spaced proximate relation to said impeller magnet, said motor assembly and said impeller assembly being so constructed and so configured for being generally self-priming and for generating suction sufficient for drawing water from the aquarium and any trapped air through said water intake means into said filter housing adjacent the bottom thereof with an initial amount of water within said filter housing covering the inlet opening of said impeller assembly, the water being returned to the aquarium over said water returning means, said impeller assembly generating sufficient suction for drawing said one end of said intake tube into abutment with said impeller assembly after said self-priming is effected for providing a fluid seal between said filter housing and said impeller inlet opening.

11. The combination according to claim 10 wherein said impeller assembly includes a housing having openings therein for passage of water therethrough.

12. The combination according to claim 11 wherein said means for fixedly positioning said intake tube relative to said impeller assembly are clip means on the bracket portion of said filter housing, said clip means being configured for gripping said intake tube means.

13. The combination according to claim 12 wherein said impeller magnet is generally washer-shaped.

* * * * *